United States Patent [19]

Hayami et al.

[11] 3,749,836

[45] July 31, 1973

[54] IMAGE SIGNAL CONVERTER IN FACSIMILE

[75] Inventors: Heijoro Hayami; Ryuzo Kan; Masami Kawabuchi, all of Kadoma, Japan

[73] Assignee: Matsushita Electric Industrial Company, Kadoma City, Osaka, Japan

[22] Filed: May 30, 1972

[21] Appl. No.: 257,528

[30] Foreign Application Priority Data

May 28, 1971 Japan ................................ 46/37336

[52] U.S. Cl. 178/69.5 TV, 178/6.6 DD, 178/DIG. 3

[51] Int. Cl. ................................................ H04i 7/00

[58] Field of Search............... 178/69.5 TV, 6.6 DD, 178/DIG. 3, 6.8

[56] References Cited

UNITED STATES PATENTS 3,601,536 8/1971 Calfee ......................... 178/69.5 TV 3,603,725 9/1971 Cutler ............................ 178/DIG. 3

*Primary Examiner*—Howard W. Britton
*Assistant Examiner*—Fay Konzem
*Attorney*—John Lezdey, Robert S. Auten et al.

[57] ABSTRACT

An image signal converter in the receiver of a facsimile system comprising a first memory for memorizing successive horizontal line signals contained in an image signal carried on a facsimile signal transmitted, and a second memory for consecutively memorizing the horizontal line signals by one field. The first memory is adapted to memorize the horizontal line signals reversely of the time base when the horizontal scanning direction in the sender is reversed and, on the other hand, the second memory is adapted to memorize the horizontal line signals in reverse order when the vertical scanning direction in the sender is reversed.

3 Claims, 35 Drawing Figures

IMAGE SIGNAL CONVERTER IN FACSIMILE

The present invention relates to a facsimile system and, more particularly, to an image signal converter in a facsimile system. The specific purpose of the invention is to provide an improved image signal converter which can desiredly convert a facsimile signal transmitted from a sender of the fasimile system into a prepared video signal, e.g., TV signal.

Generally an image signal converter according to the invention comprises a demodulator for demodulating a facsimile signal carrying an image signal containing a synchronizing pulse train and constituted by a plurality of consecutive horizontal line signals, a separator for separating the synchroninzing pulse signal from the image signal, a read-in pulse generator for producing read-in pulses in dependence on the synchronizing pulse train, a read-out pulse generator for producing read-out pulses, a memory circuit for memorizing the consecutive horizontal line signals in response to the read-in and read-out pulses, and an endless recorder for successively recording the read-out horizontal line signals from the memory circuit.

The specific structure of the invention will be understood when the detailed description is read-in conjunction with the accompanying drawings in which:

FIGS. 8A to 8L are diagrams showing various waveforms appearing in the read-out pulse generator of FIG. 7;

Figure 1A:
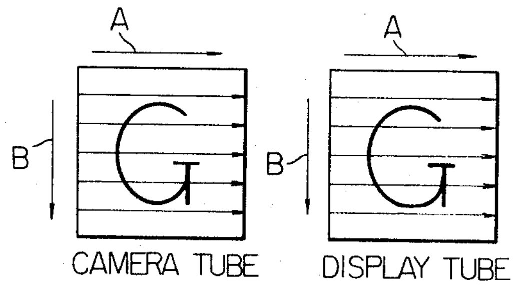
FIGS. 1A to 1C are diagrams showing a pattern irradiated and reproduced on the faceplates of camera and display tubes employed in a facsimile system.
Figure 1B:
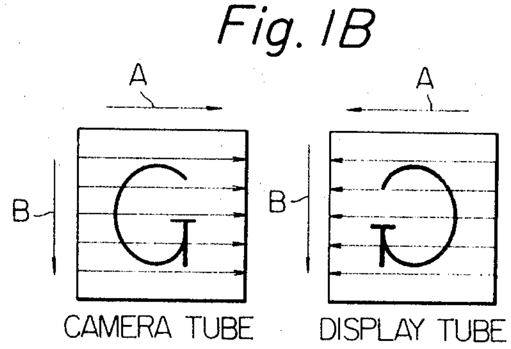
Figure 1C:
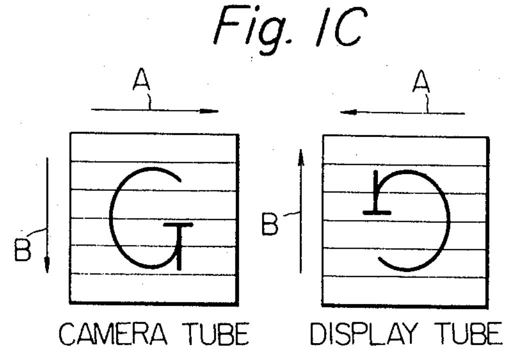

A facsimile system generally includes pick-up means for converting an optical image which is, for example, carried on a photograph, written message, etc., into an electric image signal, transmission means for transmitting the image signal, and reproduction means for reconverting the transmitted image signal into an optical image corresponding to the optical image picked up. The pick-up means usually includes a camera tube which converts the optical image into an electric image signal through the progressive scanning of an electron beam generated therein. The reproduction means, on the other hand, includes a flying-spot tube which reconverts the image signal into an optical image through progressive scanning of an electron beam generated therein. It is, in this instance, necessary that both the progressive scannings in the camera and display tubes correspond to each other in the fundamental factors, e.g., scanning direction, scanning speed, scanning order and scanning area. Otherwise, there will be reproduced an unwantedly distorted or inverted optical image by the reproduction means. FIGS. 1A to 1C in the accompanying drawings illustrate diagrammatically patterns irradiated and reproduced on the face-plates of camera and display tubes employed in a facsimile system, in which the main and sub-scanning directions are indicated by arrows A and B.

In ordinary facsimile system, the reproduced image by the reproduction means is usually recorded or printed as a hard copy on a recording medium such as a photo-sensitive sheet. In some cases, however, it is more convenient or practical to display an image carried by the image signal on a display tube than to record the image on a photo-sensitive sheet as a hard copy. The image signal should be, in these cases, converted into a repetition signal similar to the TV video signal. When, especially, an optical image carried by a facsimile signal should be reproduced on a TV receiver. The image signal is usually converted into a TV video signal through the following steps of: recording the optical image on a information recording medium, picking up the recorded optical image by a TV camera tube which produces an image signal, and converting the image signal into a TV video signal. It is, however, more desirable to convert the image signal into the TV video signal without using the TV camera tube. In such case, the reproduction means should include an image signal converter for converting the image signal into the repetition signal such as TV signal which can be readily re-converted into as signal image by a picture tube.

Figure 2:
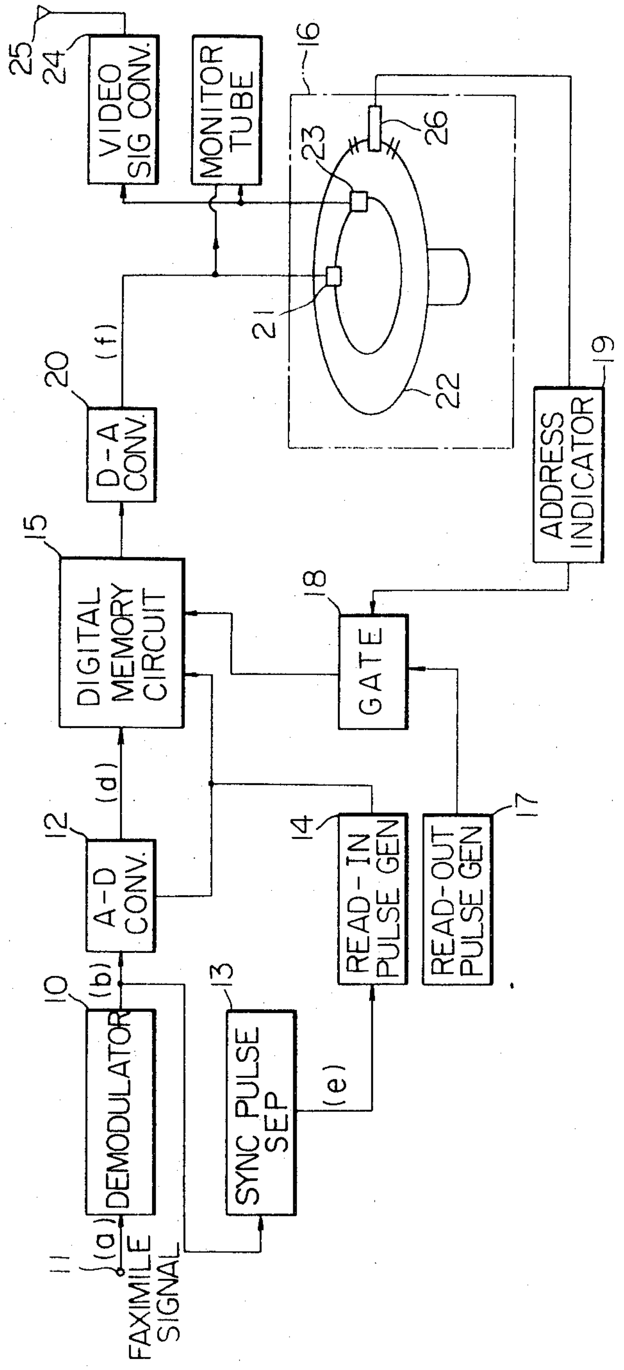
FIG. 2 is a schematic block diagram of a conventional image signal converter.
Figure 3A:
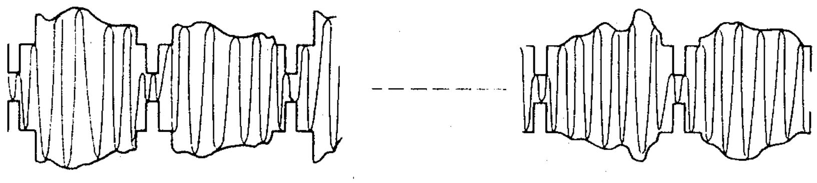
FIGS. 3A to 3F are diagrams showing various waveforms appearing in the converter of FIG. 2.
Figure 3B:
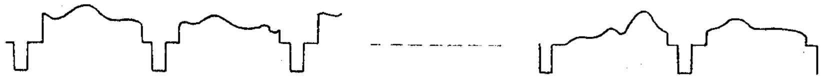
Figure 3C:
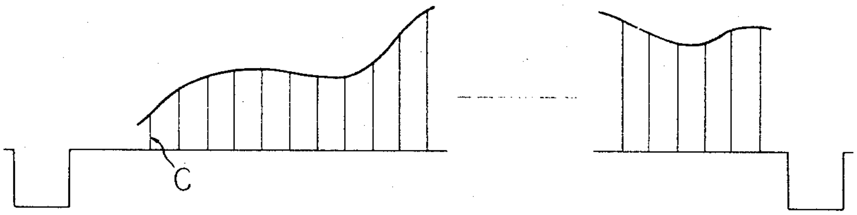
Figure 3D:
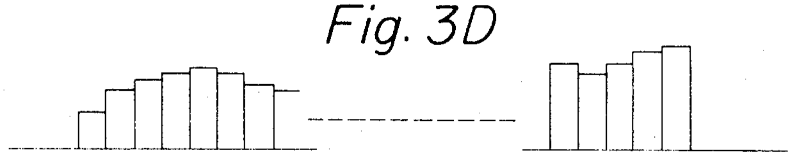

FIG. 2 illustrates an image signal converter for use with a receiver of facsimile system, which comprises a demodulator 10 which receives a facsimile signal carrying an image signal through an input terminal 11. The facsimile signal is, for example, modulated in amplitude and has a waveform shown in FIG. 3A. The demodulated signal, namely, the image signal which accordingly has a waveform shown in FIG. 3B appears on an output terminal of the demodulator 10. The image signal is then applied to an analogue to digital (A–D) converter 12 which samples the image signal with sampling pulses indicated by C shown in FIG. 3C and produces a digital signal as shown in FIG. 3D.

Figure 3E:
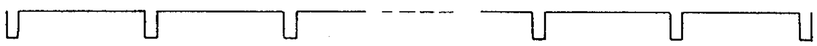
Figure 3F:

The image signal from the demodulator 10 is applied to a synchronizing pulse separator 13 which separates from the image signal synchronizing pulses shown in FIG. 3E. The synchronizing pulses are applied to a read-in pulse generator 14 which then produces read-in pulses. The read-in pulses are delivered to the A–D converter 12 which uses the read-in pulses as the sampling pulses. The read-in pulses are also delivered to a digital memory circuit 15 which then opens its gate thereby to receive the sampled image signal and progressively memorize the sampled image signal. The digital memory circuit 15 continues the memorizing or read-in operation during a time period corresponding to the horizontal scanning period (1H) of the facsimile signal. The thus memorized sampled image signal corresponding to 1H period should be read out and memorized in an endless recorder such as a video disc recorder (VDR) 16 preparatory to converting the image signal into a video signal. When the memorized sampled image signal should be read out, a read-out pulse generator 17 is started to produce read-out pulses which is delivered to one input of a gate 18. An address indicator 19 receives an address signal from the VDR 16 and produces an address indicating signal which is delivered to the other input terminal of the gate 18. The gate 18 passes therethrough the read-out pulses when triggered by the address indicating signal. The read-out pulses passed through the gate 18 is applied to the digital memory circuit 15 which then read-out the memorized sampled image signal. A digital to analogue (D-A) converter 20 converts the read-out image signal into an analogue signal, as shown in FIG. 3F. It should be noted that the analogue signal has a waveform similar to that of the original image signal but is compressed in the time axis, since the read-out pulses has a repetition frequency much larger than that of the read-in pulses. For example, the read-out pulses has a frequency of several $MH_z$ while the read-in pulses has that of several $KH_z$. The analogue image signal from the D-A converter 20 is delivered to a read-in head 21 of the VDR 16. The read-in head 21 is positioned in the close proximity of the surface of a magnetic disc 22 so that the image signal is memorized in an endless track on the disc 22 through magnetization of the disc 22 by the magnetic field produced by the head 21 and having a magnitude according to the image signal. The image signal memorized on the disc 22 is picked up through a read-out head 23 which is positioned in the close proximity to the disc 22 and aligned to trace the same track as the head 21. The picked up image signal is delivered to a video signal converter 24 which converts the image signal into a repeated video signal suitable for a television system such as the NTSC system. PAL system, etc. The video signal may be then radiated through an antenna 25, if desired. Synchronizing pulses are, on the other hand, memorized at an annular edge portion of the disc 22 and detected by a detector 26. The synchronizing pulses from the detector 26 are applied to the address indicator 19. The image signal read-in or read-out may be observed through a monitor tube, if desired.

Figure 4:
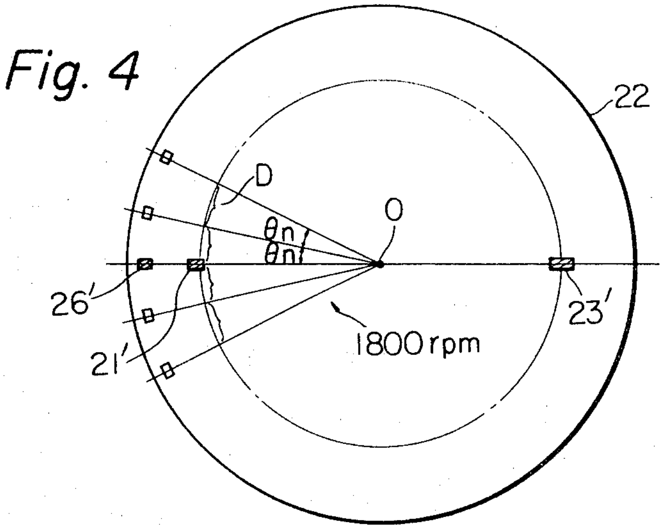
FIG. 4 is a diagram showing a disc of a video disc recorder (VDR) in a simplified form.

FIG. 4 illustrates in detail the surface of the disc 22 which is arranged to rotate about a point 0. The read-in and read-out heads 21 and 23, and the detector 26 locate at points indicated by 21', 23' and 26'. The rotation speed of the disc 22 is selected so that the disc 22 rotates through 360° for a time period corresponding to one field of the video signal produced by the converter 24. When, for example, the time period of one field is 1/30 sec., the rotation speed of the disc 22 should be 1,800 r.p.m. The image signal corresponding to 1H is memorized on an arc subtended by a central angle $\theta_n$ as indicated by D. When the number of the horizontal scanning line (raster) of a display tube for reproducing the video image is 262, the angle $\theta_n$ equals to 360°/262.

The digital memory circuit 15 may be substituted for an analogue memory circuit and, in this case, the A-D and D-A converters 12 and 20 are omitted.

The above stated image signal converter is correctly operable as long as the facsimile signal contains a correct image signal produced by a constant scanning of a sender of the facsimile system. It is, however, a problem that the image signal is inverted in the time base in case the scanning direction in the sender is unavoidably inverted at times. Such a problem takes place when the image signal is produced by a camera carried on a weather satellite which usually rotates in the ecliptic plane. The weather satellite carries thereon a photo-detector is directed toward the surface of the earth and which produces an image signal representing various condition on the earth surface, such as, temperature distribution, ocean temperature and cloud distribution in dependence on the spin motion and revolution around the earth of the satellite.

Figure 5A:
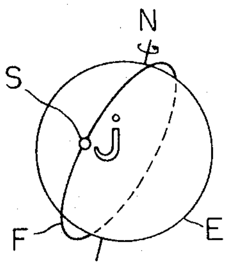
FIGS. 5A and 5B are diagrams showing revolution movement of a satellite around the earth.

It is to be understood that the spin motion and revolution of the satellite respectively correspond to main and subscannings of the photo-detector. The revolution period of the satellite is, in this instance, selected unequal to multiples of the spin period of the earth so as to permit the photo-detector on the satellite scans the whole surface of the earth. It is now assumed that the satellite S revolves around the earth E through an orbit F as shown in FIG. 5A, so that, the satellite S passes over a pattern J on the earth E from north to south, as shown. As long as the satellite revolutes around the earth and the earth spins under the above stated relationship, it naturally and repeatedly occurs that the satellite passes over the pattern J from south to north as shown in FIG. 5B.

Figure 5B:
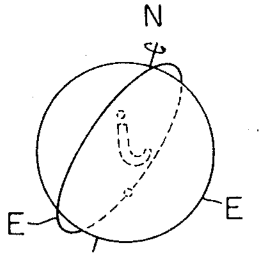
Figure 5C:
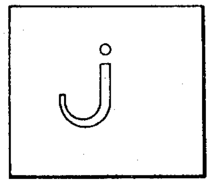
FIGS. 5C and 5D are diagrams showing patterns reproduced on the faceplate of a picture tube from image signals which is produced by the satellite moving as shown in FIGS. 5A and 5B.
Figure 5D:
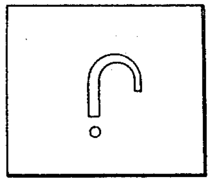

When it is assumed that an image signal produced by the satellite passing over the pattern J from north to south is reproduced on the faceplate of a picture tube as shown in FIG. 5C, an image signal produced by the satellite passing over the pattern J from south to north as in FIG. 5B will be reproduced on the faceplate in an inverted form as shown in FIG. 5D, that is, the pattern J is inverted in both north-to-south and east-to-west. Such inversions of the reproduced image are inevitable in this facsimile system incorporated with the satellite and may occur in the other facsimile system in which a sender scans an object or optical image in alternately different directions.

In order to avoid such problem as above stated, an improved image signal converter is provided by the present invention. An image signal converter of the invention has the same elements and construction as the image signal converter of FIG. 2 except the digital memory circuit 15 and the read-out pulse generator 17. Therefore, only a digital memory circuit and read-out pulse generator of an image signal converter of the invention will be explained herein below.

Figure 6:
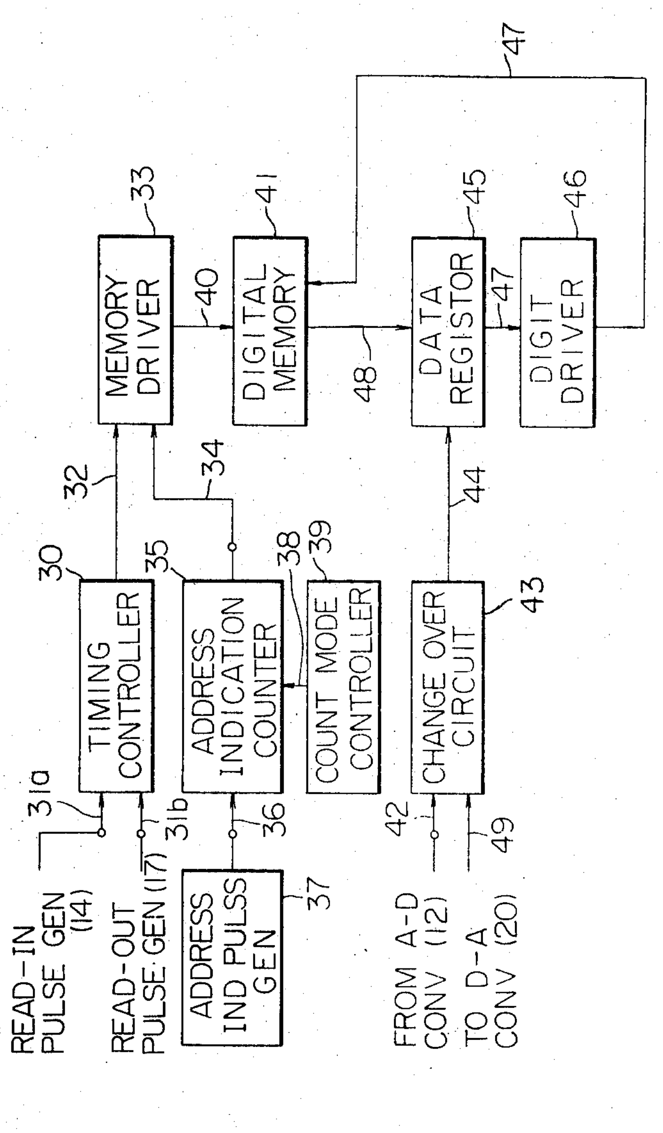
FIG. 6 is a block diagram of a digital memory circuit in an image signal converter of the invention.

In FIG. 6, a preferred digital memory circuit incorporated in an image signal converter of the invention is shown, comprising a timing controller 30 which has two input terminals 31*a* and 31*b* connected to the read-in and read-out pulse generators 14 and 17. The timing controller 30 is adapted to produce a drive signal on a line 32 when triggered by the read-in or read-out pulse. The drive signal on the line 32 is applied to an input terminal of a memory driver 33.

Another input terminal of the memory driver 33 is connected through a line 34 to an output terminal of a reversible address indication counter 35. The reversible address indication counter 35 receives through a line 36 address indication pulses produced by an address indication pulse generator 37 and counts the address indication pulses in an either addition or subtraction mode. The counting mode of the address indication counter 35 is controlled by a control signal applied thereto through a line 38 from a counting mode controller 39. The counting mode controller may be operated manually or automatically in a predetermined timing to produce the control signal. When the address indication pulse counter 35 counts the address indication pulses till a predetermined number, the counter 35 produces an address signal which is delivered through the line to the memory controller 33.

When the memory controller 33 receives the drive signal and the address signal, the controller 33 produces memory drive signal which is applied through a line 40 to a digital memory 41 such as a wire memory. A sampled image signal from the A-D converter 12 is, on the other hand, applied to an input terminal 42 of a change over circuit 43 which passes therethrough the image signal. The image signal passed through the change over circuit 43 is delivered through a line 44 to an input of a data register 45 which memorizes the image signal. The memorized image signal is read out by a digit driver 46 by way of a line 47 and applied through the line 47 to the digital memory 41. The digital memory 41 memorizes the digital image signal from the digit driver 46 when driven by the memory drive signal from the memory driver 33.

When, in read-out operation, read-out pulses are applied to the timing controller 30, the timing controller 30 produces the drive signal on the line 32. The address indication counter, on the other hand, counts in the addition mode the address indication pulses and produces address indication signal on the line 34. The memory driver 33 receives the drive signal and the address indication signal and produces the memory drive signal which triggers the digital memory 41. When the digital memory 41 is triggered by the memory drive signal the memory 41 produces the memorized image signal in the indicated address on a line 48 which is then temporarily memorized by the data register 45. The register 45 thereafter produces the image signal memorized therein on the line 44. The image signal on the line 44 is then led through the change over circuit 43 and a line 49 to the D–A converter 20.

It is to be noted that since the counting mode controller 39 controls the address indication counter 35 in synchronism with the east-to-west inversion timing of the image signal carried on the facsimile signal applied to the image signal converter, the image signal is forwardly memorized in the digital memory 41 when the image signal is normal or correct and, on the contrary, reversely memorized when the image signal is inverted. The address indication counter 35, on the contrary, always operates in the addition mode during the read-out operation. Therefore, the image signal read-out from the digital memory 41 appears in a constant time base of east to west. Hence, the image signal inverted in the time base of east to west is corrected desiredly.

Figure 7:
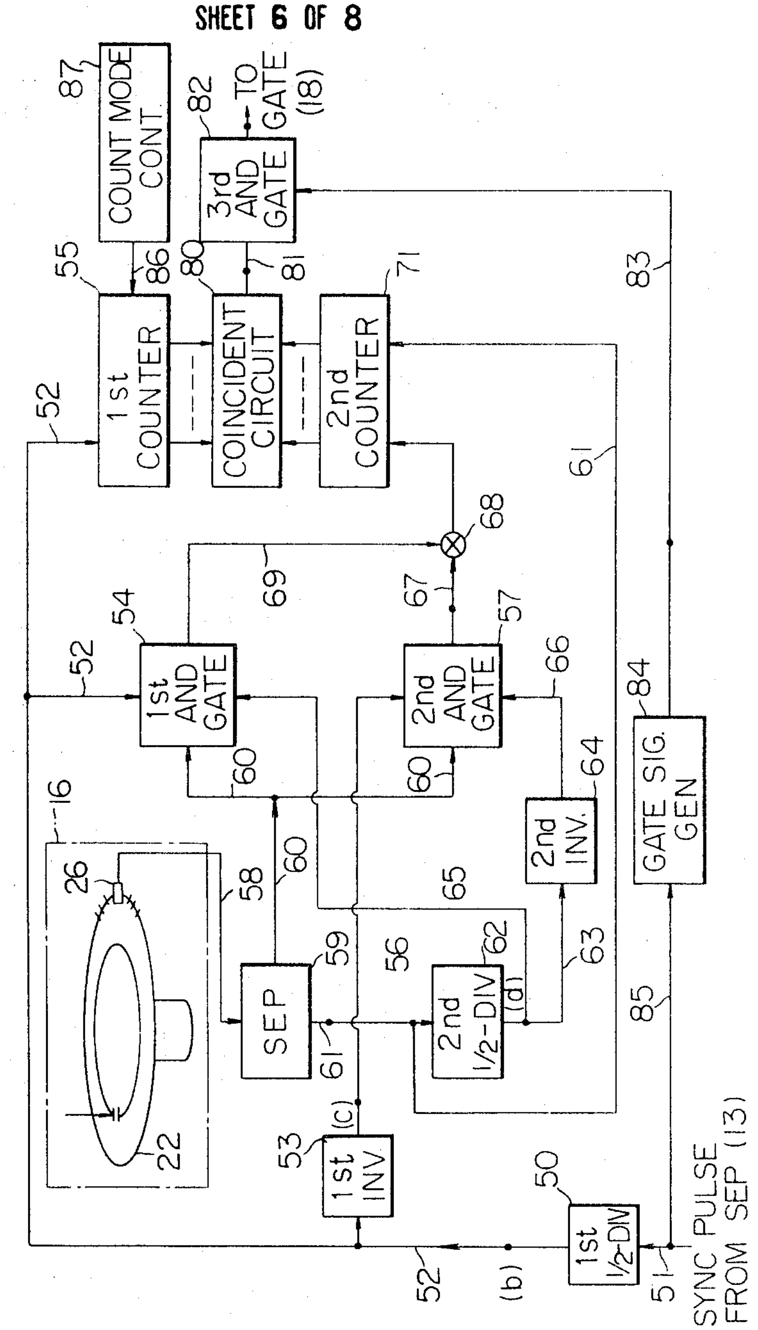
FIG. 7 is a block diagram of a read-out pulse generator in an image signal converter of the invention.

FIG. 7 illustrates an improved read-out pulse generator 17 which comprises a first one-half divider 50 having an input terminal 51 connected to the output terminal of the separator 13. An output terminal of the first one-half divider 50 is connected through a line 52 to a first input of a first inverter 53, a first input of a second gate 57 and an input of a second counter 71 which is reversible. An output terminal of the first inverter 53 is connected through a line 56 to an input terminal of a first gate 54. The detector 26 of the VDR 16 is connected through a line 58 to an input terminal of a separator 59 which separates from the signal of the detector 26 horizontal and vertical pulse signals on lines 60 and 61, respectively. The line 61 is connected to a second input terminal of the first gate 54 and to a second input terminal of the second gate 57. The line 61 is connected to an input terminal of a second one-half divider 62 and to a reset terminal of a first counter. An output terminal of the second one-half divider 62 is connected through a line 63 to an input terminal of a second inverter 64 and through a line to a third input terminal of the second gate 57. An output terminal of the second inverter 64 is connected through a line 66 to a third input terminal of the first gate 54 which has an output terminal connected through a line 67 to one input terminal of an adder 68. The other input terminal of the adder 68 is connected to an output terminal of the second gate 57. An output terminal of the adder 68 is connected through a line 69 to a trigger terminal of a first counter output terminals from all the stages of both the counters 55 and 71 are connected to input terminals of a coincident circuit 80 which produces a coincident pulse signal on its output terminal when numbers counted by the first and second counters 55 and 71 coincide with each other. The output terminal of the coincident circuit 80 is connected through a line 81 to one input terminal of a gate 82. The other input terminal of the gate 82 is connected through a line 83 to an output terminal of a gate signal generator 84 which has an input terminal connected through a line 85 to the separator 13. An output terminal of the gate 82 is connected to the gate 18. The first counter 55 is controlled by a mode control signal through a line 86 from a counter mode controller 87 to operate under the addition or subtraction mode.

The above stated converter of the invention is adapted to convert the image signal into a video signal to be reproduced on a display tube through the interlacing scanning and accordingly the disc 22 of the VDR 16 of the invention converter is arranged to rotate at a speed of 1,800 r.p.m.

Figures 8A, 8B, 8C, 8D, 8E, 8F, 8G, 8H, 8J, 8K, 8L:
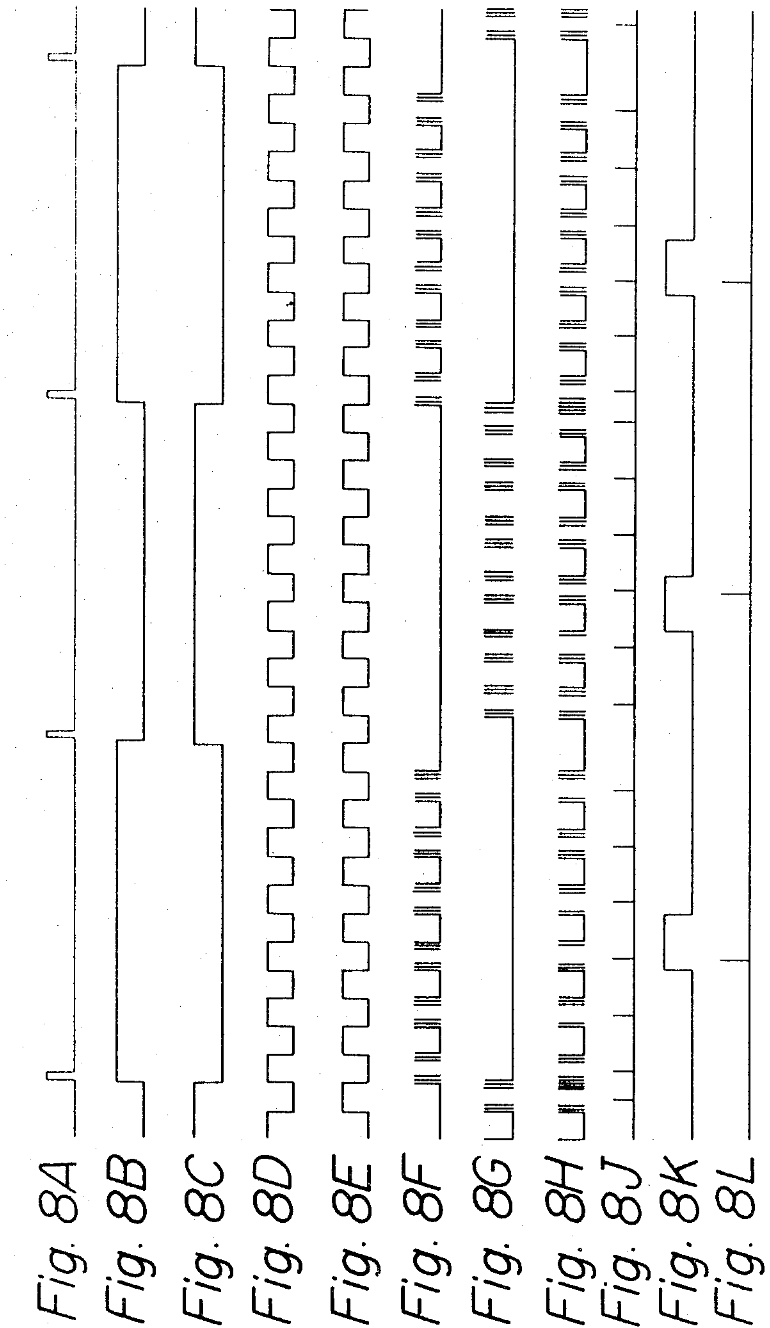

When, in operation, synchronizing pulses as shown in FIG. 8A is applied through the input terminal 51 to the first one-half divider 50 which then produces a pulse signal as shown in FIG. 8B. The pulse signal is counted by the first counter 55. The pulse signal is delivered to the first inverter 53 which then produces an inverted pulse signal as shown in FIG. 8C. The inverted pulse signal is applied to the second AND gate 57. The separator 59 separates from a signal from the detector 26 a horizontal synchronizing pulse signal and a vertical synchronizing pulse signal. The horizontal and vertical synchronizing pulse signals have, for example, frequencies of 15.75 $KH_z$ and 60 $K_z$. The vertical synchronizing pulse signal on the line 61 is applied to the second one-half divider 62 which then produces a pulse signal as shown in FIG. 8D. The pulse signal from the one-half divider 62 is inverted into a pulse signal as shown in FIG. 8E. The first and second AND gates 54 and 57 produce on the lines 69 and 67 signals as shown in FIGS. 8F and 8G. The pulses on the lines 69 and 67 shown in FIGS. 8F and 8G respectively correspond to even and odd field, and vice versa. The signals on the lines 69 and 67 are added by the adder which then produces on the line 70 a signal as shown in FIG. 8H. The pulses on the line 70 are counted by the second counter 71. When the counter 71 counts the same number of pulses as that of the counter 55, the coincident circuit 80 produces on the line 81 the coincident signal as shown in FIG. 8J. The gate signal generator 84, on the other hand, produces a gate signal as shown in FIG. 8K in response to the synchronizing pulse from the separator 13. The gate signal on the line 83 is applied to the third AND gate 82 which then passes therethrough the coincident signal on the line 81. The coincident signal passed through the third AND gate 82 is shown in FIG. 8L and is delivered to the gate 18 as the read-out pulse signal.

When the first counter 55 operates in the addition mode the image signal for consecutive horizontal lines 1H, 1'H, 2H, 2'H, 3H, 3'H, . . . , are memorized on the disc 22 of the VDR in an order as indicated by arrows G and G'. When, on the contrary, the first counter 55 operates in the subtraction mode, the image signal for consecutive horizontal lines of 263H, 263'H, 262H, 262'H, 261H, 261'H, . . . , are memorized on the disc 22 in an order as indicated by arrows K and K' as shown in FIG. 10.

Figure 9:
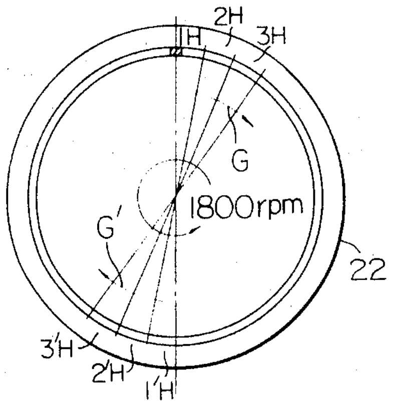
FIGS. 9 and 10 are diagrams showing manners in which the image signal for consecutive horizontal lines are memorized on the disc of the VDR.
Figure 10:
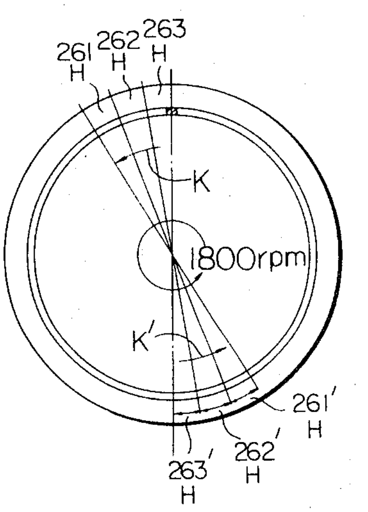
Figure 11:
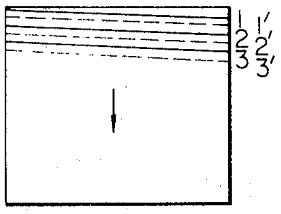
FIGS. 11 and 12 are diagrams showing manners in which the image signals memorized on the disc as shown in FIGS. 9 and 10 are reproduced on the faceplate of a picture tube.
Figure 12:
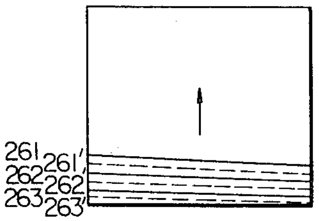

When the memorized image signal in such manner as shown in FIG. 9 or 10 is converted into the video image signal, the image signal is reproduced on the faceplate of a picture tube as shown in FIG. 11 or 12.

What is claimed is:

1. An image signal converter in a receiver of a facsimile system, which comprises::

- a demodulator for demodulating a facsimile signal carrying an image signal so as to separate said image signal from said facsimile signal, said image signal being produced through horizontally and vertically scanning an optical image and mixed with a synchronizing pulse train so that said image signal is constitutied by a plurality of successive horizontal line signals;
- a separator for separating said synchronizing pulse train from said image signal;
- a read-in pulse generator for producing read-in pulses in dependence on said synchronizing pulse train;
- a read-out pulse generator for producing read-out pulses;
- a memory circuit for memorizing said successive horizontal line signals and reading out the memorized horizontal line signals in response to said read-in and read-out pulses, said memory circuit including a timing controller for producing a start signal in response to said read-in or read-out pulses, an address indication pulse generator for producing an address indication pulses, a counting mode controller for producing an addition or subtraction mode signal, an address indication counter for counting said address indication pulses in addition mode when received said addition mode signal and in subtraction mode when received said subtraction mode signal and for producing an address indication signal when having counted a predetermined number of said address indication pulses, a memory driver for producing a memory drive signal when received both said start signal and said address indication signal, a memory for memorizing said horizontal line signals when received said memory drive signal and read-out means for reading out the memorized horizontal line signals when received said read-out pulses; and
- an endless recorder for successively recording the read-out horizontal line signals from said memory circuit.

2. An image signal converter as claimed in claim 1, in which said read-out pulse generator includes a horizontal and vertical synchronizing pulse signal generator for producing horizontal and vertical synchronizing pulse signals for said repeated video signal, a gate signal generating means for producing gate pulse signals each having a frequency equal to one-half of the repetition frequency of said synchronizing pulse train, said gate pulse signals being inverse in phase, one-half divider for one-half dividing said vertical synchronizing pulse signal, an inverter for inverting in phase the divided vertical synchronizing pulse signal, a first AND gate for passing therethrough said horizontal synchronizing pulse signal when received said divided vertical synchronizing pulse signal and one of said gate signals, a second AND gate for passing therethrough said horizontal synchronizing pulse signal when received the inverted and divided vertical synchronizing pulse signal and the other of said gate signals, an adder for adding the horizontal synchronizing pulse signals passed through said first and second AND gates, a first counter for counting said one of the gate signals in addition or subtraction mode, a second counter for counting the added horizontal synchronizing pulse signals, a coincident circuit for producing a coincident signal when the counted number of said first and second counter coincide with each other, a gate signal generator for producing an output gate signal in accordance with said synchronizing pulse train, and a third AND gate for passing therethrough said coincident signal when received said output gate signal.

3. An image signal converter as claimed in claim 2, in which said horizontal and vertical synchronizing pulse signal generator includes a disc of a video disc recorder, said vertical and horizontal synchronizing pulse signals being recorded on said disc, and a detector for detecting the vertical and horizontal synchronizing pulse signals recorded on said disc.

* * * * *